(12) United States Patent
Staudt

(10) Patent No.: US 6,425,719 B1
(45) Date of Patent: Jul. 30, 2002

(54) SCREW-LOCKING ASSEMBLY FOR GARDEN SHEARS

(75) Inventor: Gerhard Staudt, Schmelz (DE)

(73) Assignee: WOLF-Garten GmbH & Co. KG (DE)

( * ) Notice: Subject to any disclaimer, the term of this patent is extended or adjusted under 35 U.S.C. 154(b) by 0 days.

(21) Appl. No.: 09/806,173

(22) PCT Filed: May 11, 2000

(86) PCT No.: PCT/EP00/04258
§ 371 (c)(1),
(2), (4) Date: Mar. 28, 2001

(87) PCT Pub. No.: WO01/18410
PCT Pub. Date: Mar. 15, 2001

(30) Foreign Application Priority Data

Sep. 3, 1999 (DE) .......................................... 299 15 560

(51) Int. Cl.$^7$ ................................................ F16B 39/10
(52) U.S. Cl. .................................... 411/119; 411/149
(58) Field of Search ......................... 411/119–121, 149, 411/150, 161

(56) References Cited

U.S. PATENT DOCUMENTS

| | | | | |
|---|---|---|---|---|
| 969,397 A | * | 9/1910 | Patridge | |
| 1,654,789 A | * | 1/1928 | Clegg | |
| 3,263,727 A | | 8/1966 | Herpolsheimer | |
| 5,314,279 A | | 5/1994 | Ewing | |
| 5,533,849 A | * | 7/1996 | Burdick | |
| 5,606,753 A | * | 3/1997 | Hashumoto | |
| 5,967,721 A | * | 10/1999 | Giachinta | |

FOREIGN PATENT DOCUMENTS

| | | |
|---|---|---|
| DE | 1625279 | 1/1970 |
| DE | 2413760 | 11/1974 |
| EP | 0131556 | 1/1985 |
| WO | 94/03736 | 2/1994 |

* cited by examiner

Primary Examiner—Flemming Saether
(74) Attorney, Agent, or Firm—Ostrolenk, Faber, Gerb & Soffen, LLP

(57) ABSTRACT

A screw-locking device which is suitable, in particular, for pruning shears includes a catch disk having a toothed rim with axially directed teeth and a spring collar whose teeth are formed by individual webs which extend freely between an inner ring and an outer ring of the collar. These webs have a catch of V-shaped cross section for the engagement of the teeth of the catch disk, one tooth of the catch disk lying in the clearance space of the spring collar, and the adjacent teeth engaging in the V-shaped recesses of the radial webs. According to a further refinement, the tooth webs may be provided with lateral inclined contact surfaces. The spring collar has projecting lugs on the side opposite the tooth system.

13 Claims, 3 Drawing Sheets

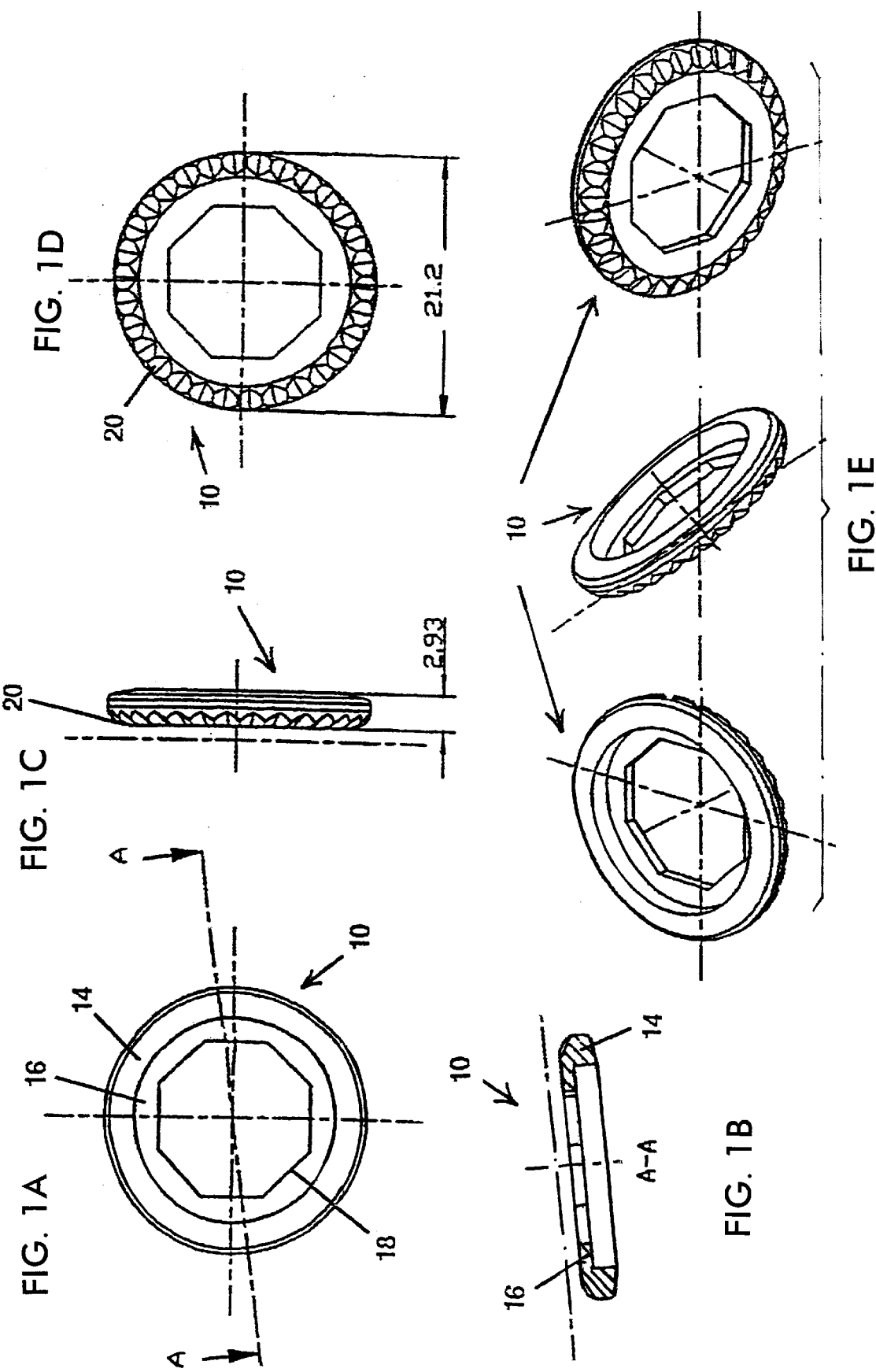

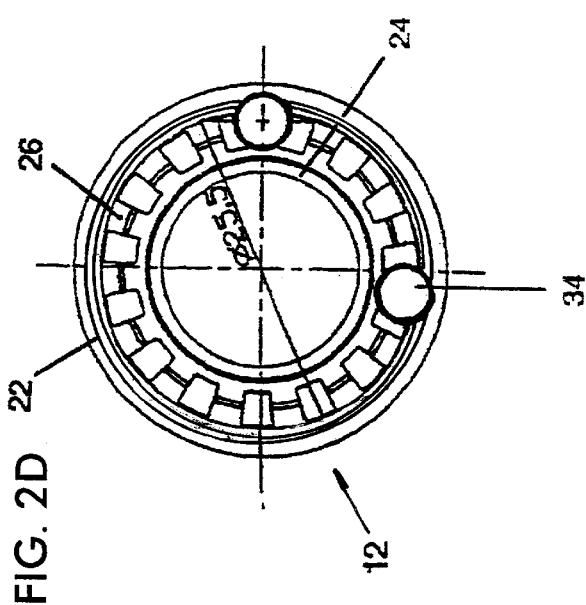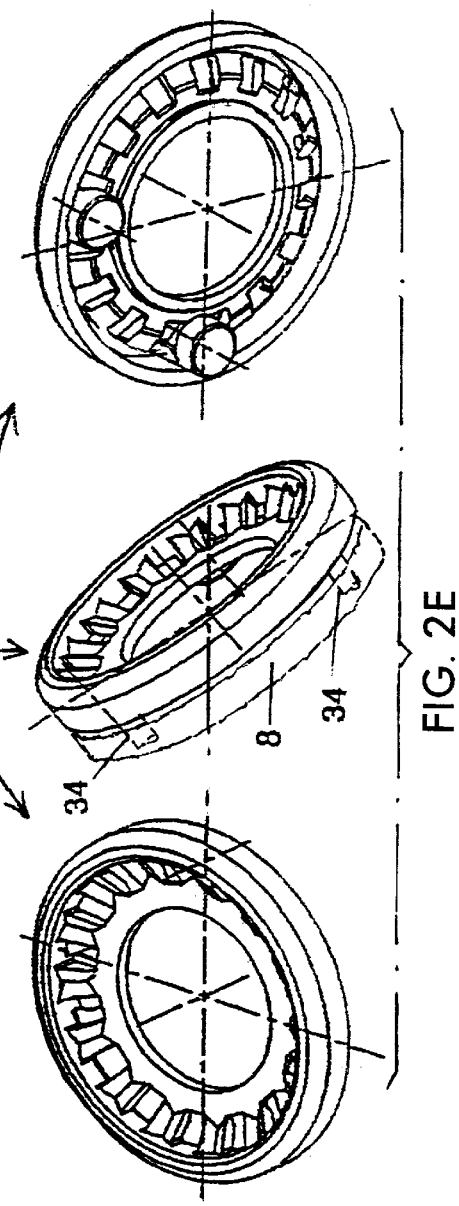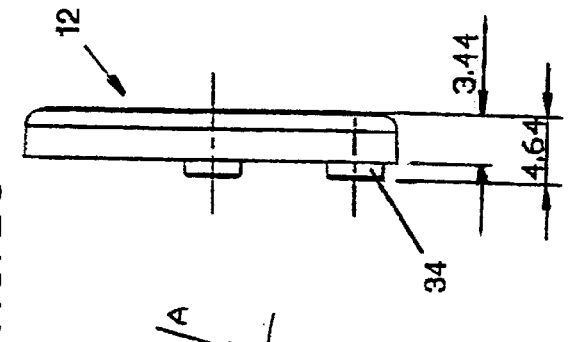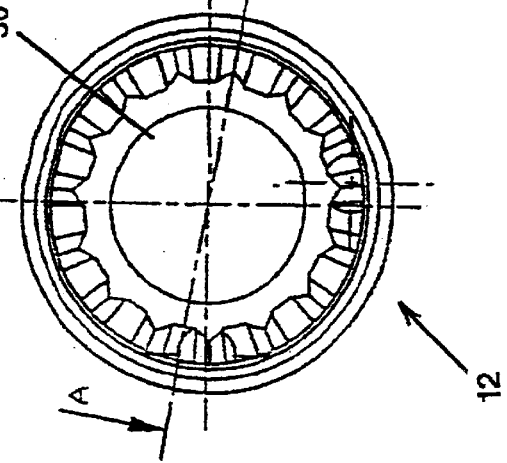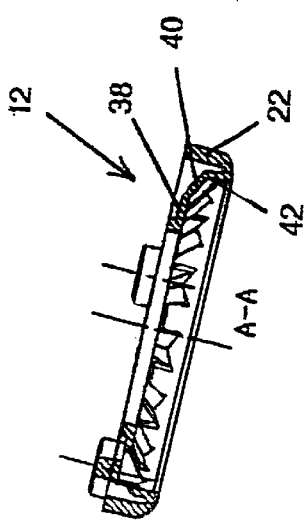

SCREW-LOCKING ASSEMBLY FOR GARDEN SHEARS

BACKGROUND OF THE INVENTION

The invention relates to a screw-locking device. Such screw-locking devices have been disclosed in a wide variety of embodiments. In general, the toothed disks are made of spring plate or plastic and are designed to be elastic in such a way that locking is effected in a certain tightening position determined by the screw thread of the joint bolt, and reduction in the tightening due to slackening of the screw is prevented. Such screw-locking devices can be used wherever the slackening of a screw or a nut is to be prevented, even if the components connected thereto are subjected to vibration. Examples of this are described in DE-A 16 25 279, DE-A 24 13 760 and U.S. Pat. No. 5,314,279.

SUMMARY OF THE INVENTION

A specific application of the screw-locking device according to the invention is the use in connection with garden shears, in particular pruning shears. In this case, it is necessary to occasionally separate the two legs of the shears from one another by unscrewing the joint bolt in order to carry out a blade change, for example, or to clean the shears. Due to repeated dismantling and assembly, the conventional screw-locking devices are often stressed and deformed in such a way that their locking effect diminishes and the joint bolt is often tightened to a greater extent than appropriate for the functioning of the legs of shears, which are mutually pivotable.

The object of the invention is therefore to design a screw-locking device of the generic type, suitable in particular for garden shears, in such a way that the operability of the anti-rotation locking is reliably retained even after repeated dismantling and assembly operations.

This is attained by a screw-locking device which has catch teeth on a spring collar arranged not in the form of a continuous toothed rim, as is the case in known screw-locking devices, but in a spaced apart manner to interact as individual teeth with a toothed rim of a catch disk. Accordingly, webs, which are secured to an inner ring and an outer ring and form the catch teeth of the spring collar, can yield about a radially running axis and, after crossing a respective tooth of the catch disk, return into the catch position. This results in better elasticity while the locking force remains constant.

The circumferential distance between two radial tooth webs of the spring collar is expediently matched to the tooth spacing of the catch disk in such a way that a material-free intermediate space of one tooth or several teeth remains between two teeth, engaging on the web teeth, of the toothed rim,of the catch disk. The result of this is that, during the relative rotation between the catch disk and spring collar, the catch webs exert a radial tensile force outward on the inner ring, so that the latter is elastically deformed in a polygonal manner and returns to the original shape after the teeth have engaged in the catch position, as a result of which the elastic yielding displacement is increased.

The resistance of the spring arms to deflection is selected to be so great that the torque which occurs when cutting a branch or the like, and which could result in slackening of the joint screw, is resisted to such a high degree that the screw cannot slacken. The continuously effective seating of the screw-locking device is brought about owing to the fact that the deflections of the radial spring webs or of the inner ring, which occur during the interlocking, always take place within the elastic range.

One of the two parts, namely the catch disk or spring collar, can be connected in a rotationally locked manner to the leg of the shears which has the tapped hole for the joint bolt, while the other part can be connected in a rotationally locked manner to the joint bolt. The screw-locking device consisting of spring collar and catch disk can be made of any desired elastic material. However, it is preferably made of an elastic plastic selected in accordance with the requirements.

Refinements of the invention follow from the subclaims:

BRIEF DESCRIPTION OF THE DRAWINGS

Exemplary embodiments of the invention are described below with reference to the drawing, in which:

FIG. 1A is a front elevation view of a catch disk of the inventive screw-locking device;

FIG. 1B is a cross-sectional view of the catch disk of FIG. 1A;

FIG. 1C is a side elevation view of the catch disk of FIG. 1A;

FIG. 1D is a rear elevation view of the catch disk of FIG. 1A;

FIG. 1E is a perspective views of the catch disk of FIG. 1A;

FIG. 2A is a front elevation view of an annular spring collar in accordance with the invention;

FIG. 2B is a cross-sectional view of the collar of FIG. 2A;

FIG. 2C is a side elevation view of the collar of FIG. 2A;

FIG. 2D is a rear elevation view of the collar of FIG. 2A;

FIG. 2E are perspective views of the collar of FIG. 2A.

FIG. 5b is a view corresponding to FIG. 4b of the teeth in accordance with the sectional view according to FIG. 5a.

DETAILED DESCRIPTION OF THE DRAWINGS

Figure 3:
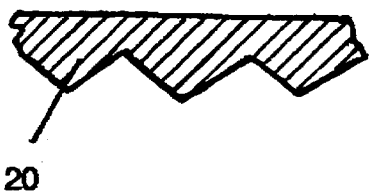
FIG. 3 is, on an enlarged scale, a sectional view of a development of a tooth system of the catch disk according to FIGS. 1A–1E.
Figure 4A:
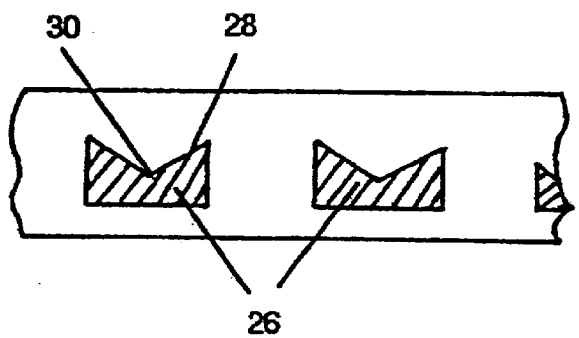
FIG. 4a is a section of the development of the catch teeth of the spring collar according to FIG. 2.
Figure 4B:
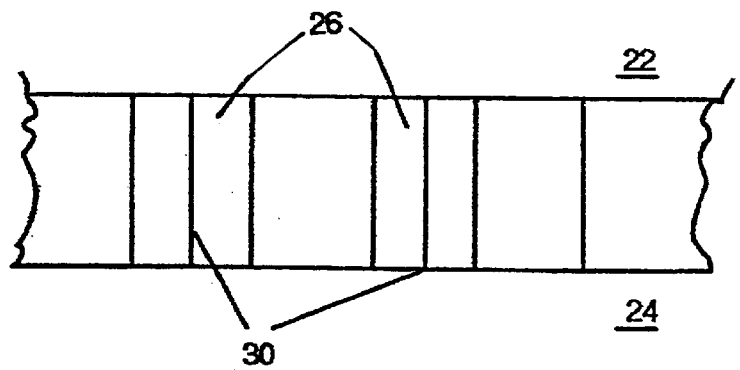
FIG. 4b is an axial view of the developed catch teeth of the spring collar.
Figure 5A:
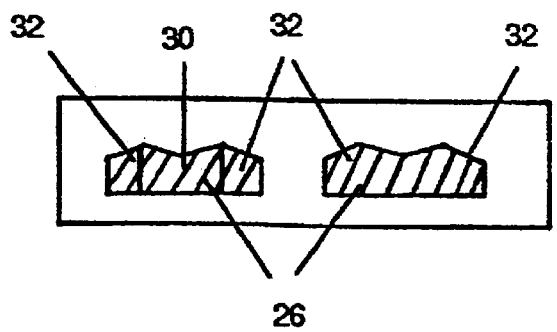
FIG. 5a is a sectional view corresponding to FIG. 4a of a modified embodiment of the teeth of the spring collar.
Figure 5B:
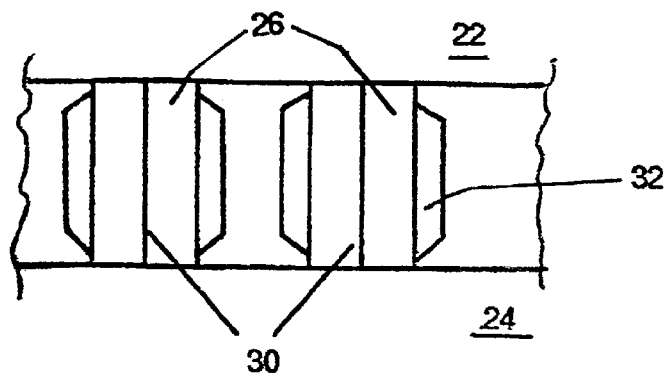

The screw-locking device according to the invention consists of a catch disk 10 FIGS. 1A–1E and an annular spring collar 12 FIGS. 2A–2E. The catch disk 10 of plate-shaped design has an encircling raised margin 14 and a flat plate base 16, in which an octagonal profile 18 is integrally formed, with which the catch disk 10 can be mounted in a rotationally locked manner on an octagonal profile of the joint screw 6, which is shown diagrammatically on FIG. 1E and is designed to connects two legs 8 of shears (only one leg is shown diagrammatically on FIG. 1E) to one another. The catch disk 10 has an axial toothed rim 20 radially running, prismatic catch teeth. As can be seen from FIGS. 1C–1E, this toothed rim 20 is of conical design. Turning to FIGS. 2A–2E, the spring collar 12 has an outer ring 22 running over the entire axial length and an inner ring 24 located at the collar base. Integrally formed between inner ring 24 and outer ring are radial webs 26, which, as can be seen from FIGS. 4a, 4b and 5a, 5b, have a V-shaped catch recess 28, which has an apex line 30 and am which the catch teeth of the toothed rim 20 of the catch disk 10 engage. The radial webs are arranged in the circumferential direction at a distance apart which corresponds to a tooth spacing of the catch disk. The individual webs are therefore able to freely tilt individually and independently of one another about radially running axes, and the teeth of the toothed rim 20 of the catch disk 10 engage in the intermediate space between adjacent webs 26. In the exemplary embodiment according to FIGS. 5a, 5b, inclined contact surfaces 32 are integrally formed laterally on the webs, and the teeth of the toothed rim 20 run up onto these inclined contact surfaces 32. During this run-up movement, the webs 26 can rotate about their radial axis, as a result of which the desired effect is achieved.

On its side facing the leg of the shears (undergrip lever), the spring collar 12 has lugs 34 which engage in a positive-locking manner in correspondingly shaped recesses of the leg of the shears and produce a rotationally locked connection with this leg of the shears. The center opening 36 of the spring collar is designed in accordance with the diameter of the joint screw (not shown in the drawing).

The outside diameter of the catch disk 10 corresponds to the inside diameter of the outer ring 22 of the spring collar, so that the catch disk fits into this spring collar, and the teeth of the toothed rim 20 can interact with the radial webs 26, which form the mating tooth system of the spring collar. In the sectional view A—A according to FIG. 2B, the radial form of the catch webs 26 is shown more clearly. Accordingly, the webs consist of a section 38 lying in the plane of the collar base, a center section 40 lying on a slender cone, and an outer section 42 running essentially perpendicularly to the collar base.

The radial webs 26 are designed in an elastic manner as spring arms, in which the resistance to deflection is selected to be so great that the torque which occurs when cutting with the shears, and which could cause slackening of the joint screw, is resisted to such a high degree that the screw remains locked. Uniformly effective screw seating is brought about owing to the fact that the deflections of the spring arms which occur during the interlocking always take place within the elastic range, so that damage to the catch arms is ruled out. Even if the screw interacting with the screw-locking device is frequently released, for example when changing the blades or when cleaning the shears, there is no impairment of the operability.

The arrangement of the radial webs of the spring collar, forming the tooth system, and of the tooth spacing on the toothed rim of the catch disk is made in such a way that in each case one tooth of the toothed rim of the catch disk lies in the clearance space of the spring collar, i.e. between two webs in each case, while the adjacent teeth engage in the V-shaped recess of the webs.

LIST OF DESIGNATIONS

10 Catch disk
12 Annular spring collar
14 Margin
16 Plate base
18 Octagonal profile
20 Toothed rim
22 Outer ring
24 Inner ring
26 Radial webs
28 Catch recess
30 Apex line
32 Inclined contact surfaces
34 Lugs
36 Center opening
38 Section
40 Center section
42 Outer section

What is claimed is:

1. A screw-locking device for attaching a first rotatable element to a second rotatable element that they may rotate together around a rotation axis, the screw-locking device comprising:

an annular spring collar mountable on the first element in a rotationally locked manner, the annular spring collar comprising a radially inner ring, a radially outer ring outward of the inner ring and a toothed rim extending in the direction between the inner and outer rings;

the toothed rim comprising a plurality of radial direction webs between the inner and outer rings and facing in a first axial direction, the webs being spaced apart in the circumferential direction around the spring collar and defining intermediate spaces between adjacent webs;

a catch disk mountable on the second element in a rotationally locked manner, the catch disk having a second toothed rim including teeth projecting in a second axial direction toward the webs, and at least some of the teeth on the second toothed rim engaging the radial webs of the spring collar in order to avoid relative rotation of the first and second elements.

2. The screw-locking device of claim 1, wherein some of the teeth of the toothed rim of the catch disk engage in the intermediate spaces between adjacent webs of the spring collar.

3. The screw-locking device of claim 2, wherein the adjacent webs of the spring collar have intermediate spacing in the circumferential direction corresponding to the tooth spacing of the catch disk.

4. The screw-locking device of claim 3, wherein the webs are so shaped that some of the teeth of the catch disk nest on the webs.

5. The screw-locking device of claim 1, wherein each of the webs is of v-shaped cross-section and each of the teeth of the catch disk is complementary v-shaped so that the v-shaped webs may receive a respective tooth of the catch disk.

6. The screw-locking device of claim 1, wherein each of the radial webs has respective opposite inclined contact surfaces on opposite circumferential direction sides, the inclined surfaces being shaped so that the teeth of the catch disk run up onto the inclined contact surfaces.

7. The screw-locking device of claim 6, wherein each web has a radially inner section starting at the inner ring and extending parallel to a plane in which the collar is located, a radially outer section extending essentially perpendicular to the plane of the collar and an inclined center section joining the radially inner and outer sections and inclined relative to the plane of the collar.

8. The screw-locking device of claim 7, wherein the teeth of the catch disk are oriented on essentially a conical surface generally parallel to the inclined center section of the webs of the spring collar.

9. The screw-locking device of claim 1, wherein the catch disk has a central polygonal opening for rotationally locking connection to the second element.

10. The screw-locking device of claim 1, further comprising ribs on the spring collar axially extending from a side of the spring collar away from the teeth and for rotational locking connection of the spring collar to the first element.

11. The screw-locking device of claim 10, wherein the spring collar is comprised of an elastic plastic.

12. The screw-locking device of claim 1, wherein the catch disk is comprised of an elastic plastic.

13. The screw-locking device of claim 12, wherein the spring collar is comprised of an elastic plastic.

* * * * *